Patented June 16, 1936

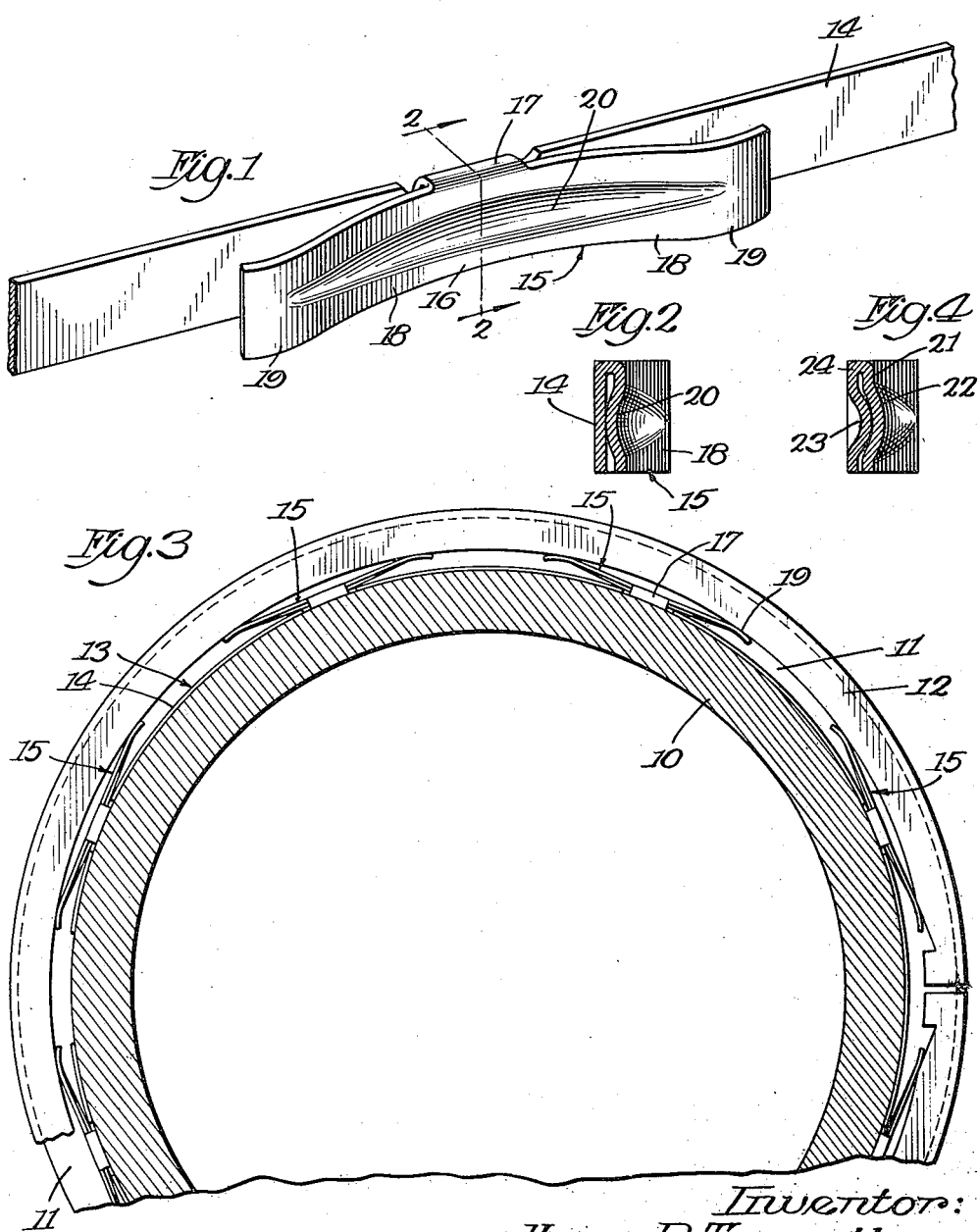

2,044,453

UNITED STATES PATENT OFFICE 2,044,453

PISTON RING EXPANDER

Harry P. Troendly, Chicago, Ill., assignor to The Perfect Circle Company, Hagerstown, Ind., a corporation of Indiana Application September 27, 1935, Serial No. 42,442

4 Claims. (Cl. 309—43)

My invention relates to piston ring expanders for internal combustion engines and the like, and it has to do more particularly with expanders of a type embodying a supporting band adapted to be mounted in a piston ring groove and carrying a plurality of spring members arranged to expandingly engage the piston ring.

One of the objects of my invention is to provide an improved piston ring expander of the foregoing character, which is simple in construction, and which is highly efficient and durable in use.

Another object is to provide a piston ring expander wherein the spring members include spring arms that are so constructed and arranged that the bending and flexing strains and stresses imposed thereon are distributed throughout the length of such arms in such a way that they flex uniformly throughout their length, thereby insuring longer spring life and the desirable ring-expanding action.

Other objects and advantages will become apparent as this description progresses and by reference to the drawing wherein,—

Figure 1 is a fragmentary perspective view of one form of expander embodying my invention;

Fig. 2 is a section taken substantially on line 2—2 of Fig. 1;

Fig. 3 is a sectional plan view of a piston showing the expander in position behind a piston ring; and Fig. 4 is a view similar to Fig. 2 of a modified form of expander embodying my invention.

In the drawing (Fig. 3), I have shown my invention as applied to a piston 10 having a ring groove 11 in which a piston ring 12 is mounted. A piston ring expander 13 embodying my invention is mounted in the ring groove 11 behind the ring 12.

The piston ring expander (Figs. 1 and 2) includes a supporting band 14 and a plurality of spring members 15, which may be integrally cut and formed from a sheet of soft steel and thereafter heat-treated and tempered so that they become hard and resilient and have the characteristics of spring steel. The band 14 and the spring members 15 are preferably of a width equal to the width of the ring groove 11 and the supporting band 14 is of a length slightly less than the circumference of the bottom of such ring groove.

Each spring member 15 includes an intermediate portion 16 connected to the upper edge of the band 14 by a neck 17. Spring arms 18 project in opposite directions from the intermediate portion 16 and they are disposed in overlying, spaced and substantially parallel relation with respect to the band 14. The spring arms 18 are slightly bowed or curved at their ring-engaging points 19, thereby avoiding tendency of the sharp end edges of the spring arms 18 to dig into the surface of the ring.

It is desirable that centralization of the flexing or bending strains and stresses be avoided at any one point in the spring arms 18. To that end, each spring member 15 is provided with an inward continuous crown 20 of sufficient length to extend from near the end of one spring arm 18 through the intermediate portion 16 to near the end of the other spring arm. This crown 20 is of greatest width and depth at the intermediate portion 16 of the spring member 15 and it gradually reduces in both width and depth toward the outer ends of the spring arms 18. With this construction, resistance to bending action at various points along each spring arm 18 is gradually increased from the outer end thereof toward the intermediate spring member portion 16, so that the bending strains and stresses imposed thereon are distributed uniformly throughout the length of the arm rather than at one point (for example, at the junction of the spring arms 18 with the intermediate portion 16). This arrangement, as above stated, not only improves the spring action of the spring arms 18, but it also materially increases the life of the spring members 15 and expander as a whole. In this form of my invention, the crown 20 is adapted to abut the band 14 immediately behind the intermediate spring member portion 16 thereby holding the spring member 15 in a desired spaced relation with respect to the supporting band 14 and also providing a support for the spring member 15.

If desired, the crown may be formed outwardly in the spring member, rather than inwardly as shown in Figs. 1 and 2. For example, as illustrated in Fig. 4, the spring member 21 is provided with an outward crown 22 which is formed similarly to the crown 20 except that it extends outwardly rather than inwardly. In this form, desired spacing and supporting of the spring members 21 are accomplished by an embossment 23 formed in the supporting band 24 immediately behind the mid-portion of the spring member crown 22. The embossment 23 is of sufficient height to engage the rear of the spring member crown as illustrated in Fig. 4.

I believe that the operation and advantages of my invention will be well understood from the foregoing description. When the expander is mounted in the ring groove, its supporting band 14 fits snugly upon the bottom of the ring groove 11 and the ring contacting points 19 of the spring arms 17 freely engage the inner surface of the ring with a minimum of friction. In this manner, the desired pressure characteristics of the ring and the proper contact between the ring and the cylinder bore are assured.

It will be understood that, while I have shown only two forms of structure embodying my invention, other changes in details and arrangement of parts may be resorted to without departing from the spirit and scope of my invention as defined by the claims that follow.

I claim:

1. A piston ring expander comprising a supporting band, spring members carried by said band and each having spring arms extending in opposite directions in overlying and spaced relation to the outer face of said band, said spring members each being provided with a crown extending throughout the greater part of its length and which is of greater depth and width at the central portion of the spring member and is gradually reduced in depth and width toward the ends of said spring arms.

2. A piston ring expander comprising a supporting band, spring members carried by said band and each having spring arms extending in opposite directions in overlying and spaced relation to the outer face of said band, said spring members each being provided with an inwardly extending crown extending continuously from adjacent the outer end of one of said spring arms to adjacent the outer end of the other of said spring arms, said crown being comparatively wide and deep adjacent the inner ends of said spring arms and being gradually reduced in width and depth toward the outer ends of said arms.

3. A piston ring expander comprising a supporting band, spring members carried by said band and each having spring arms extending in opposite directions in overlying and spaced relation to the outer face of said band, said spring members each being provided with an outwardly extending crown extending continuously from adjacent the outer end of one of said spring arms to adjacent the outer end of the other of said spring arms, said crown being comparatively wide and deep adjacent the central portion of said spring member with the sides thereof converging toward each other toward the outer ends of said arms and with the depth of the crown gradually decreasing in opposite directions toward the ends of itself.

4. A one-piece piston ring expander comprising a supporting band, spring members carried by said band and having an intermediate portion carrying spring arms extending in opposite directions and overlying said band in spaced relation thereto, said spring members each being provided with a crown extending lengthwise thereof and having its ends terminating adjacent the outer ends of said spring arms, said crown being of greatest depth and width in the intermediate portion of said spring member, the depth of said crown in said intermediate portion being such as to engage said band and hold the remainder of said spring member spaced from the latter, and said crown being of gradually reducing depth and width from said intermediate portion toward the outer ends of said arms.

HARRY P. TROENDLY.